S. W. YOUNG.
PROCESS FOR TREATING SULFUROUS FUMES.
APPLICATION FILED OCT. 18, 1915. RENEWED NOV. 15, 1917.
1,262,295.
Patented Apr. 9, 1918.
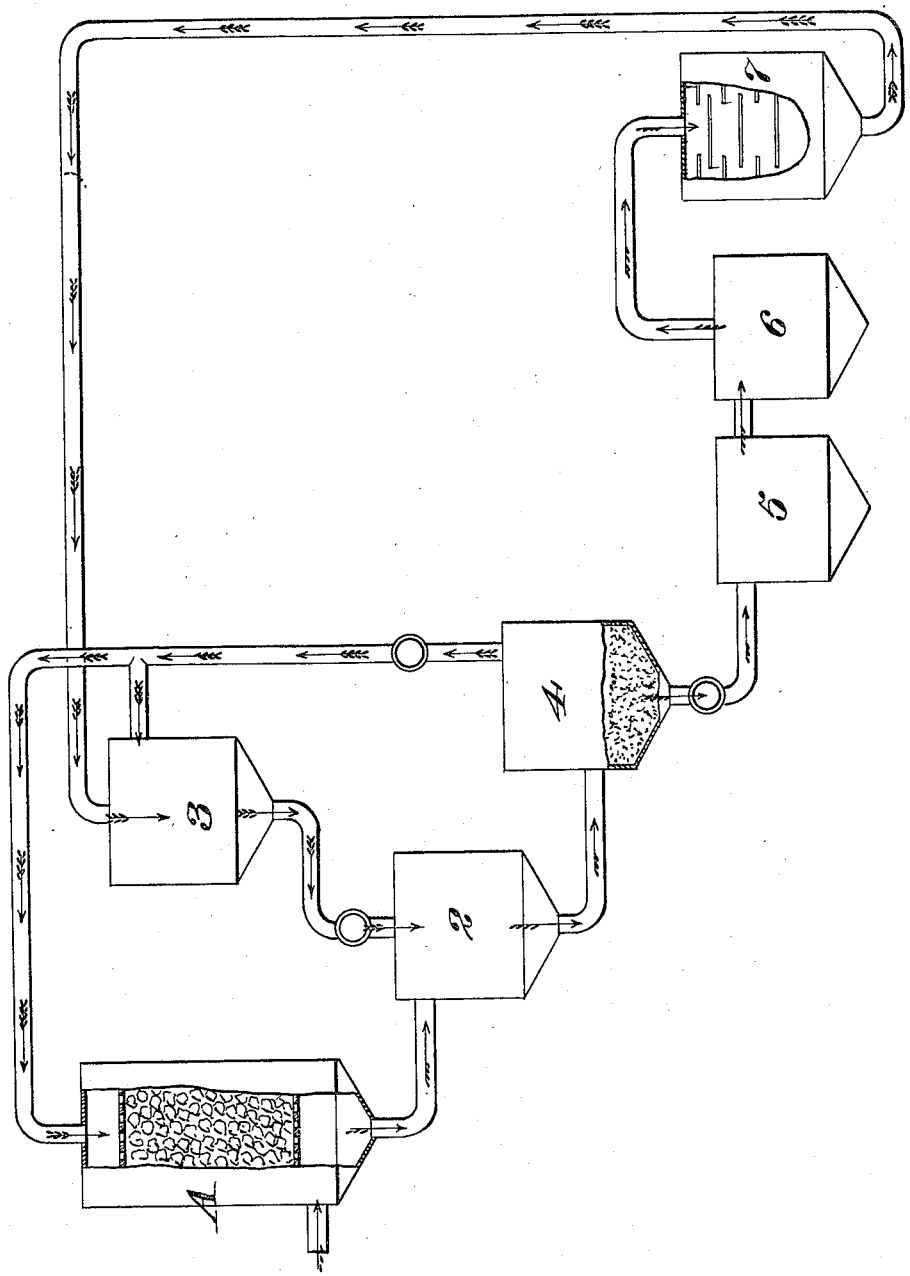
WITNESSES:
Charles Pickles
Thos Castberg
INVENTOR
Stewart W. Young
BY Strong & Townsend
ATTORNEYS

UNITED STATES PATENT OFFICE.

STEWART W. YOUNG, OF PALO ALTO, CALIFORNIA, ASSIGNOR TO THE THIOGEN COMPANY, OF WILMINGTON, DELAWARE, A CORPORATION OF DELAWARE.

PROCESS FOR TREATING SULFUROUS FUMES.

1,262,295. Specification of Letters Patent. Patented Apr. 9, 1918.

Application filed October 18, 1915, Serial No. 56,382. Renewed November 15, 1917. Serial No. 202,245.

*To all whom it may concern:*

Be it known that I, STEWART W. YOUNG, a citizen of the United States, residing at Palo Alto, in the county of Santa Clara and State of California, have invented new and useful Improvements in Processes for Treating Sulfurous Fumes, of which the following is a specification.

The object of this invention is the elimination of sulfur dioxid from smelter gases and converting the same into a useful product, namely, elemental sulfur.

The invention comprehends a cyclical process, consisting of various chemical, physical and mechanical operations whereby it is possible to accomplish the above result in a practical manner.

Having reference to the accompanying drawing:

The figure illustrates an apparatus suitable for carrying out the invention.

The essential operations of this process are as follows:

1. The gases issuing from a roaster, reverberatory or blast furnace, or from any other device whereby sulfurous fumes are produced, after being freed from dust by any satisfactory process, are submitted to the action of water in a suitable absorption tower A. By this means the sulfur dioxid is absorbed from the gases to any extent which is considered desirable, and the residual gases on escaping are freed from this deleterious substance to any desired extent, and completely, if necessary. As a result of the absorption of the sulfur dioxid in the water, there results a solution of the gas in water, this solution being commonly known as sulfurous acid.

2. The solution of sulfurous acid is then mixed in a tank 2 with a previously prepared solution (or in some cases suspension) of a suitable sulfid in water admitted from a tank 3. This sulfid solution is preferably barium sulfid, although in some cases the sulfids of calcium, sodium, potassium, or even those of zinc, iron and many others might be used. As a general rule it is found advantageous to use the sulfid of a metal whose oxyen-sulfur acid salts (sulfites, thiosulfates, etc.) are comparatively insoluble.

As a result of the mixing together of the sulfur dioxid solution and the barium sulfid solution a somewhat complex chemical reaction occurs which results in the formation of a number of substances; the more important ones being free sulfur, sulfites, thiosulfates and thionates of the metallic base used in making the sulfid solution. In case barium sulfid is used, those products are all very insoluble and carry no combined water. They form a sludge which settles rapidly and filters with great ease. This is not generally true of other sulfids, and it is for this reason that the barium compound is preferred.

3. The sludge obtained from operation two is settled and filtered at 4, and the solids are dried at 5 in preparation for operation four. The liquid from the sludge, which is practically pure water, is returned, in part, to the absorption tower A and, in part, to the solution tank 3, being used over again in operation one.

4. The dried solids are brought to a temperature of from 450° to 500° centigrade in a heater 6, whereby the thiosulfates and thionates are broken up giving free sulfur and barium sulfite and some sulfate. The free sulfur thus produced, together with the large amount already present, distils off at this temperature, and may be collected as brimstone, flowers of sulfur, or in any other desired form. The residue consists almost wholly of barium sulfite, with some little sulfate.

5. The residue from operation four is finally reduced to barium sulfid at 7, in which form it is returned to 3 and dissolved in water and reënters the cycle in operation two. The reduction is accomplished by heating to a temperature of from 700° to 800° centigrade in contact with carbon-containing reducing agents such as: (*a*) powdered coal or coke, lamp black or other carbonaceous material; (*b*) reducing gases, such as coal or oil gas, water gas, or natural gas. In some cases it is feasible to reduce by mixing the residue directly with petroleum and then raising the temperature to 700° or 800° centigrade. A small amount of iron salts accelerates the reduction. The barium sulfid thus obtained is dissolved in water and reënters the cycle at operation two.

There is accomplished as the result of this cycle of operations, the conversion of the sulfur dioxid to elemental sulfur. The only material used up in the process is the coal, oil, gas or other substances used in the reduction of the barium sulfite to barium sulfid. The barium compounds and the water travel continuously around the cycle and are used up only as the result of mechanical losses.

Having thus described my invention, what I claim and desire to secure by Letters Patent is—

1. The method of treating sulfurous fumes, which consists in absorbing them in water, and neutralizing the solution thus obtained by mixing with a solution or suspension of a suitable sulfid.

2. The method of treating sulfurous fumes, which consists in absorbing them in water, and neutralizing the solution thus obtained by mixing with a solution or suspension of barium sulfid.

3. A method of treating sulfurous fumes which comprises contacting said fumes with water to absorb sulfur dioxid, causing the resulting sulfur dioxid solution to react with a suitable sulfid to produce a precipitate of sulfur compounds including sulfur and sulfites, and converting at least a portion of said compounds into sulfids.

4. A method of treating sulfurous fumes which comprises contacting said fumes with water to absorb sulfur dioxid, causing the resulting sulfur dioxid solution to react with a sulfid of a metal whose oxygen-sulfur acid salts are comparatively insoluble, to produce a precipitate of sulfur compounds, subjecting the precipitate to destructive distillation to drive off sulfur and produce further quantities of sulfites, and reducing the sulfites to sulfids adapted to be used in treating further quantities of sulfur dioxid solution.

5. A cyclical method of treating sulfurous fumes to remove sulfur dioxid which comprises absorbing the sulfur dioxid in water, causing the sulfur dioxid solution to react with a solution or suspension of a suitable metal sulfid to produce a precipitated mixture of metal-oxygen-sulfur compounds and sulfur, reducing at least a portion of said metal-oxygen-sulfur compounds to a metal sulfid, and treating further quantities of sulfur dioxid solution with a solution or suspension of the so produced metal sulfid.

6. In a cyclical method of treating sulfurous fumes to remove sulfur dioxid, the steps which comprise absorbing the sufur dioxid in water, treating the resulting water solution with an alkaline earth metal sulfid to produce a mixture of sulfur and oxygen-sulfur compounds of the metal, heating the mixture to drive off sulfur, and heating the residue with carbon-containing reducing agents at a reducing temperature to change the residue into a metal sulfid.

In testimony whereof I have hereunto set my hand in the presence of two subscribing witnesses.

STEWART W. YOUNG.

Witnesses:
  JOHN H. HERRING,
  NITA E. PENFIELD.